D. McCARTHY.
BEAN BUNCHER.
APPLICATION FILED NOV. 15, 1917.
1,264,407.
Patented Apr. 30, 1918.
2 SHEETS—SHEET 1.
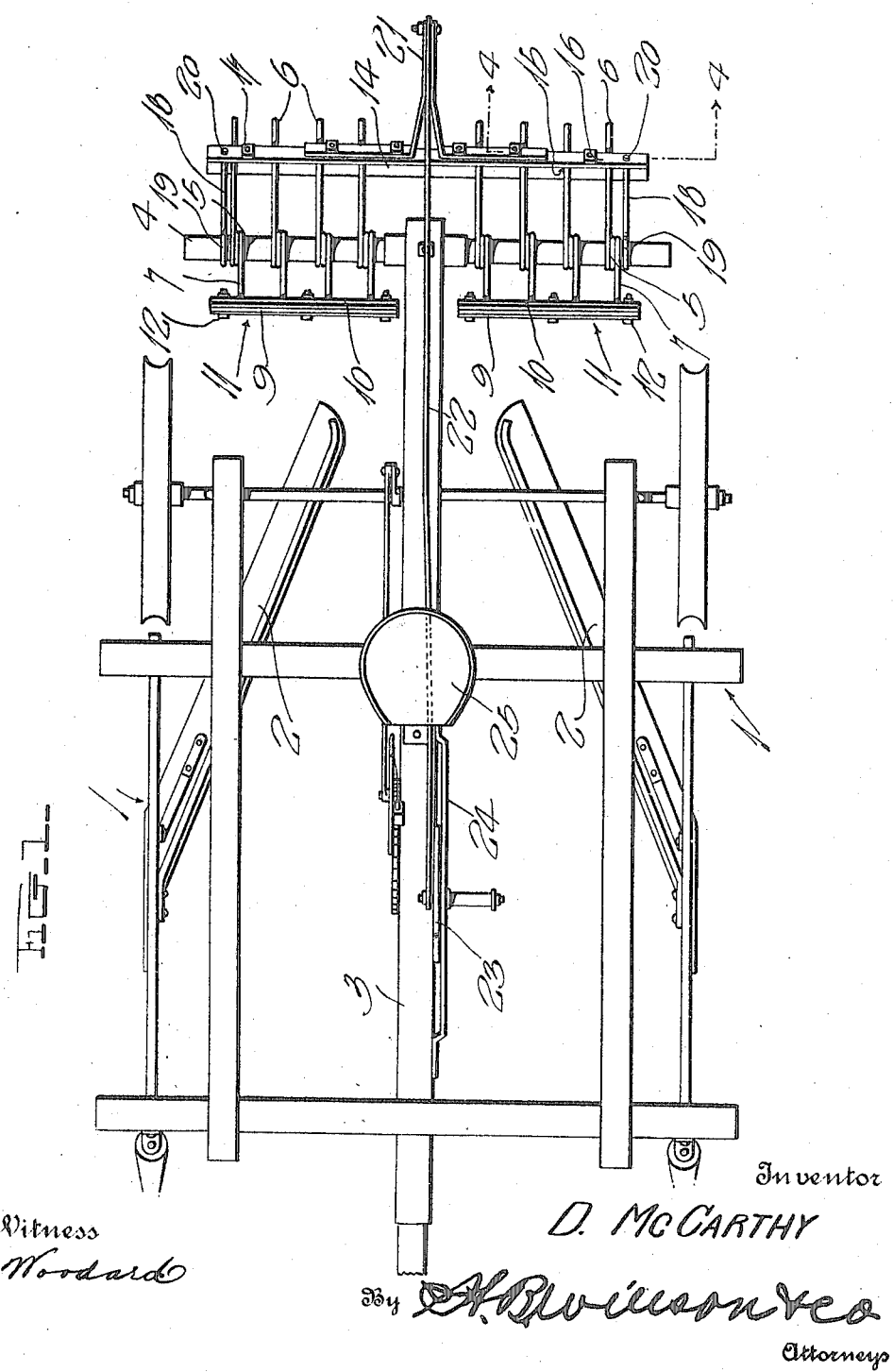
Witness
H. Woodard
Inventor
D. McCarthy
By H. B. Willson & Co.
Attorneys

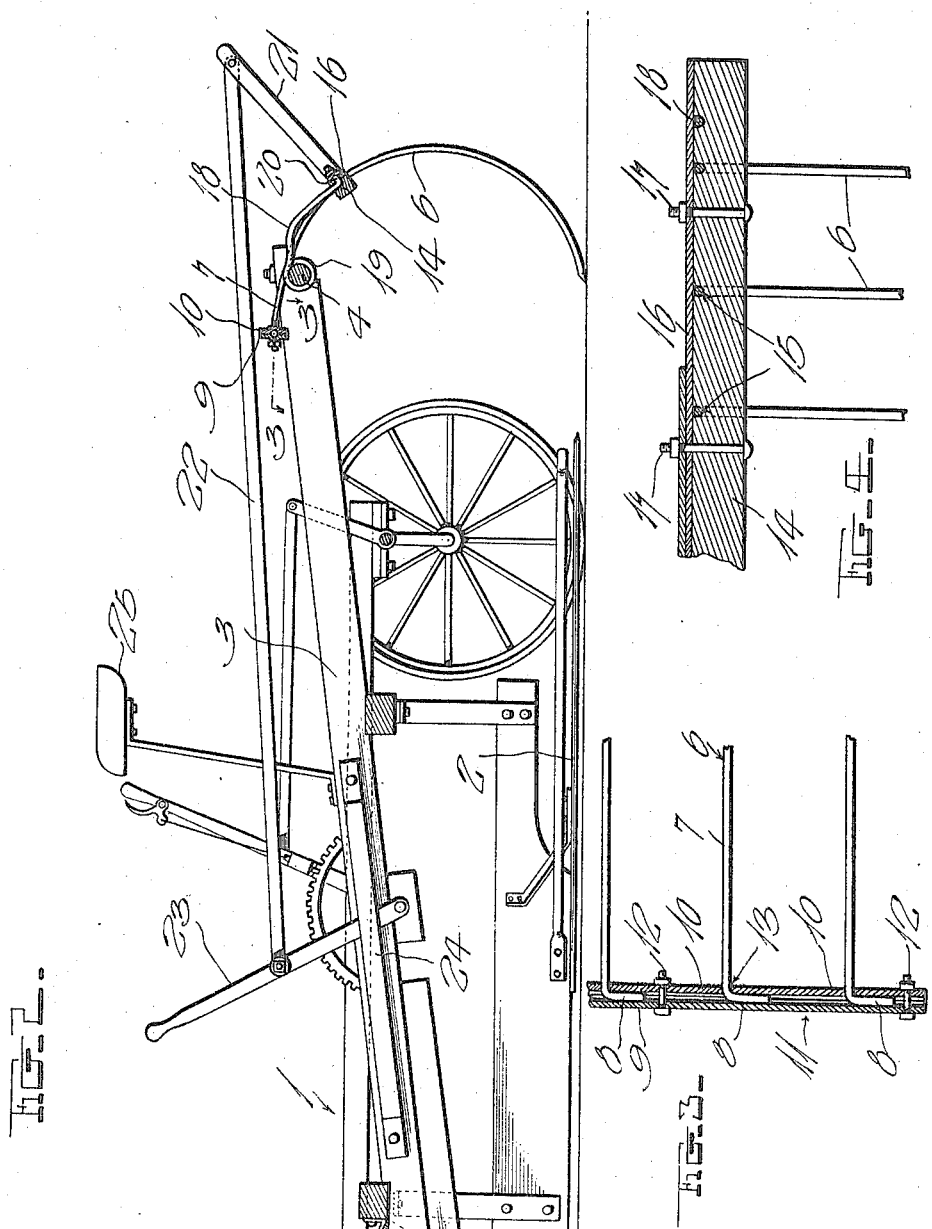

UNITED STATES PATENT OFFICE.

DENNIS McCARTHY, OF TURLOCK, CALIFORNIA.

BEAN-BUNCHER.

1,264,407.      Specification of Letters Patent.      Patented Apr. 30, 1918.

Application filed November 15, 1917. Serial No. 202,196.

*To all whom it may concern:*

Be it known that I, DENNIS MCCARTHY, a citizen of the United States, residing at Turlock, in the county of Stanislaus and State of California, have invented certain new and useful Improvements in Bean-Bunchers; and I do declare the following to be a full, clear, and exact description of the invention, such as will enable others skilled in the art to which it appertains to make and use the same.

My invention has for its main object to provide an attachment for bean harvesting or cutting machines, so constructed as to collect the cut bean vines and deposit them in bunches or piles on the field, thus not only performing the work now requiring several laborers, but effecting a great saving in time.

With the foregoing general object in view, the invention resides in the novel features of construction and unique combinations of parts to be hereinafter fully described and claimed, the descriptive matter being supplemented by the accompanying drawings which form a part of this specification and in which:—

Figure 1 is a top plan view of the attachment applied to a bean cutting machine;

Fig. 2 is a longitudinal section;

Fig. 3 is a detail horizontal section on the plane of the line 3—3 of Fig. 2; and Fig. 4 is a detail transverse section on the plane indicated by the line 4—4 of Fig. 1.

In the drawings above briefly described, the numeral 1 designates the usual frame of a bean cutting or harvesting machine which need not be described in detail. It may be stated however, that the blades 2 of the machine cut the bean vines and that these vines have heretofore been bunched or piled up by hand, but by using the present invention, the use of this labor is dispensed with at a great saving to the farmer.

The attachment includes a longitudinal bar 3 suitably secured to the frame 1 and a rigid transverse bar 4 to whose center said longitudinal bar 3 is secured, said transverse bar being located in rear of the frame 1 as shown. The bar 4 is preferably round in cross section and the coils 5 of a plurality of rake teeth 6 are mounted on said bar, said teeth extending forwardly from said coils as shown at 7 and having their front ends bent laterally as indicated at 8.

The laterally bent ends 8 of the rake teeth 6 are received in the channels of front and rear channel-shaped sections 9 and 10 of which front spacing bars 11 are former, said sections being secured together by bolts 12 or any other appropriate type of fasteners. The section 10 is provided with openings 13 through which the teeth extend as shown clearly in Fig. 3.

An additional spacing bar 14 extends across the teeth 6 in rear of the coils 5, said bar having a plurality of transverse grooves 15 in which said teeth are received, a metal strap 16 being secured to the bar by bolts or the like 17 and extending across said grooves to retain the teeth therein. In order to prevent shifting of bar 14 on the teeth 6, eye bolts 18 are provided, said bolts having their eyes 19 mounted on the bar 4, whereas the opposite ends of said bolts pass between the bar 14 and the strap 16 and are bent upwardly at 20 into openings in the latter.

A suitable arm 21 is secured to the spacing bar 14 and rises therefrom, the rear end of a longitudinal link 22 being pivoted to said arm, whereas the front end of said link is similarly connected to a foot lever 23. A guide strap 24 is provided for lever 23, said strap being secured to bar 3. In most cases, the bar 3 will be provided with a driver's seat 25 and the lever 23 will be positioned in easy reach thereof.

In operation, the teeth 6 are lowered and the machine is driven over the field with the result that as the bean vines are cut they will be carried along the field by the rake until this rake is dumped by proper actuation of the lever 23. The vines are thus deposited in piles which may easily be collected. The invention is extremely simple and therefore inexpensive, yet regardless of these characteristics, it will be highly efficient and durable, and a great time and labor saver.

Since probably the best results are obtained from the several specific details shown and described, these details are preferably employed, but I wish it understood that within the scope of the invention as claimed, numerous minor changes may well be made.

I claim:—

1. A bean bunching attachment for bean vine cutting machines comprising a central longitudinal bar adapted to be rigidly secured to and to extend rearwardly from the machine, a transverse bar rigidly secured at its center to and supported solely by the rear end of said longitudinal bar, a series of rake teeth on each side of said longitudinal bar having eyes near their upper ends rockably surrounding said transverse bar, said upper ends of the teeth extending forwardly from said transverse bar, a pair of transverse tie bars on opposite sides of said longitudinal bar and tying the projecting upper ends of the teeth of each series together, an additional tie bar in rear of said transverse bar and tying all teeth together, and means for dumping said teeth including a control on said longitudinal bar.

2. A machine of the class described comprising a portable frame including a rigid transverse bar, rake teeth having their upper ends coiled around said bar, whereby said teeth may swing vertically, the upper ends of said teeth extending beyond their coils, and being bent laterally, a spacing bar extending across said teeth in rear of the coils and having transverse grooves receiving said teeth, a metal strap secured to said spacing bar and extending over said grooves to retain said teeth therein, eye bolts having their eyes mounted on said rigid transverse bar, said bolts extending rearwardly between said spacing bar and said strap and having upturned ends received in openings in said strap, whereby said spacing bar is held against shifting longitudinally of the teeth, an additional spacing bar formed of two channel-shaped sections secured together, the channels of said sections receiving said laterally bent upper ends of the teeth to prevent turning of the latter, one of said sections having openings through which said teeth extend, and means connected to one of said spacing bars for raising and lowering said teeth.

In testimony whereof I have hereunto set my hand.

DENNIS McCARTHY.

Copies of this patent may be obtained for five cents each, by addressing the "Commissioner of Patents, Washington, D. C."